US007050956B2

(12) United States Patent
Uysal et al.

(10) Patent No.: US 7,050,956 B2
(45) Date of Patent: May 23, 2006

(54) METHOD AND APPARATUS FOR MORPHOLOGICAL MODELING OF COMPLEX SYSTEMS TO PREDICT PERFORMANCE

(75) Inventors: Mustafa Uysal, Mountain View, CA (US); Ralph Becker-Szendy, Los Gatos, CA (US); Arif Merchant, Los Altos, CA (US); Guillermo Alvarez, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1058 days.

(21) Appl. No.: 09/843,930

(22) Filed: Apr. 30, 2001

(65) Prior Publication Data

US 2002/0161566 A1 Oct. 31, 2002

(51) Int. Cl.
*G06G 7/48* (2006.01)
(52) U.S. Cl. .......................................................... 703/6
(58) Field of Classification Search ..................... 703/6
See application file for complete search history.

(56) References Cited

U.S. PATENT DOCUMENTS 6,002,854 A * 12/1999 Lynch et al. .................... 703/1

OTHER PUBLICATIONS

Shriver, E et al., "An Analytic Behavior Model for Disk Drives with Readahead Caches and Request Recording", SIGMETRICS, 1998, pp. 182-191.
Lee, E. et al., "An Analytic Performance Model of Disk Arrays", SIGMETRICS, 1993, pp. 98-109.

* cited by examiner

Primary Examiner—Hugh Jones
(74) Attorney, Agent, or Firm—Richard P. Lange

(57) ABSTRACT

A method predicts performance of a system that includes a plurality of interconnected components defining at least one data flow path. The method references a workload specification for the system. The method models the system using one or more component models. Each component model represents selected one or more of the components. Each component model is arranged in like relationship to the data flow path as the selected one or more of the components represented by the component model. Each component model is (a) a constraint upon the workload specification input to that component model or (b) a transformer of the workload specification input to that component model so as to result in one or more output workload specifications that are input workload specifications to subsequent component models along the data flow path or (c) both a constraint and a transformer. At least one of the component models is a constraint. At least some of the component models along the data flow path operate on the workload specification. In one preferred form, operating on the workload specification involves arranging the component models in a hierarchy corresponding to the data flow path; using the specified workload specification as input to the topmost component model in the hierarchy; and applying one or more of the component models to its input workload specification, starting with the topmost component model and then component models at progressively lower levels in the hierarchy. Output workload specification at one level is input workload specification at the next lower level. If the component model comprises a constraint, the method evaluates whether the input workload specification satisfies or violates the constraint. If the component model comprises a workload specification transform, the method modifies the input workload specification so as to produce one or more output workload specifications.

21 Claims, 7 Drawing Sheets

METHOD AND APPARATUS FOR MORPHOLOGICAL MODELING OF COMPLEX SYSTEMS TO PREDICT PERFORMANCE

FIELD OF THE INVENTION

The invention relates generally to modeling of data processing systems and, more particularly, to predicting performance of a complex system, exemplified by a data storage system using disk drive arrays.

BACKGROUND OF THE INVENTION

Most modern business enterprises use relatively complex computer and telecommunications networks. The design, installation and maintenance (including upgrading) of such systems are challenging tasks for the system designer and the system administrator. A particular system that is prevalent in modern networks is a data storage system, and a particular subclass of data storage systems is a disk drive array (or more simply, disk array).

Disk arrays are often used for large data storage and management applications. Some disk arrays can also store back-up copies of each file, increasing raw storage capacity requirements, system complexity, and data processing requirements. Typically, a disk array consists of one or more controllers directing input-output (I/O) operations and data flow to disks and to cache memory from a plurality of computers. Complex disk arrays may provide several layers of controllers and cache memory. Multiple hard disk drives and associated driver software-firmware, and other well known modules that implement basic functions in the data path (e.g., parity calculation engines, direct memory access (DMA) engines, buses, bus bridges, communication adapters for buses and external networks, and the like) form a relatively complex system.

FIG. 1 is a simplified schematic block diagram for a typical disk array 100. Data flow is indicated generally by dashed lines, demonstrating that a host computer A (105A) uses the left part of the array having four disk drives 135–150, and a host computer B (105B) uses the right part of the array having four disk drives 155–170. The host computers 105A and 105B connect to controllers 115A and 115B via interconnects 110A and 110B, respectively. The disk drives 135–170 so arrayed are connected to the controllers 115A and controller 115B, each having a respective cache memory 120A and 120B. An upper bus 125 and a lower bus 130 connect the disk arrays 135–150 and 155–170 to the controllers 115A and 115B. The upper bus 125 connects the disk drives 135 and 140 and the disk drives 155–160. The lower bus 130 connects the disk drives 145–150 and the disk drives 165–170.

The disk drives 135–170 may be arranged as one or more logical unit (LUs). An LU is any subset of the storage space in the entire array. An LU may be a fraction of a disk, multiple whole disks or anything in between. When LUs are employed, the host computers 105A and 105B do not store data directly into the arrays, but into associated LUs.

The disk array 100 may comprise redundant arrays and/or partitioned arrays. In a redundant array, for example, the upper half disk drives 135–140 and 155–160 may mirror the lower half disk drives 145–150 and 165–170. In a partitioned scheme, the upper half of the array (on the bus 125) may handle half the workload from the hosts A and B at any given time while the lower half of the array (on the bus 130) handles the other half of the workload.

Due to complexity, it is difficult to predict or optimize the performance of a storage array. There is a large range of workloads that can conceivably run on any given storage array, making the performance prediction of disk arrays difficult. Small variations in the system's parameters or the workload's parameters can have very significant impact on the storage array performance. For example, I/O operations can be directed to random locations on the LU generating much disk head re-positioning activity or could be sequential with little disk head re-positioning activity. Just as importantly, correlations between input-output operations can significantly impact performance; for example, if two sequential workloads are active simultaneously (e.g., to scan two database tables simultaneously), operating on the same LU, the degree of sequentiality observed on the disks might be significantly lower than if only one of them were active. Unfortunately, predicting performance of data storage arrays for a given workload is not well understood in the current state of the art. System administrators typically rely on simple rules of thumb to make array configurations and purchase decisions. Generally, the selected solution is to over-provision the system (e.g., two to five times the estimate) in order to guarantee desired performance.

One conventional approach for predicting system performance is based on empirical testing of actual systems. This approach involves building actual systems case-by-case to empirically test performance for an expected workload by trial and error. Although this approach is quite expensive and time intensive, it is nonetheless often the method employed to demonstrate the viability of a proposed system.

Another conventional technique for performance prediction uses monolithic system array modeling, looking at a proposed entire system's performance, paying little attention to the internal structure at the individual device level. Such modeling is described, for example, in E. K. Lee and R. H. Katz, *An Analytic Performance Model of Disk Arrays*, International Conference on Measurement and Modeling of Computer Systems (SIGMETRICS), 1993, pp. 98–109 (ACM 0-89791-581-X/93/0005/0098). Monolithic system array modeling is a labor-intensive process, requiring extensive empirical data gathering and analysis. Moreover, the research and development at the monolithic system level is seldom reusable to devise a new model for a new array and workload specification. Monolithic system array modeling does not take advantage of the fact that different systems can have common components.

A third conventional approach for performance modeling is detailed computer simulations, where the operation of a disk array is broken down into individual operations, each of which are then executed in a computerized simulation. Unfortunately, such simulations require high levels of individual component detail and workload detail, making them costly and time consuming to develop and to use.

A fourth approach is the composite device modeling method described in E. Shriver et al., *An Analytic Behavior Model for Disk Drives with Readahead Caches and Request Reordering*, International Conference on Measurement and Modeling of Computer Systems (SIGMETRICS), 1998, pp. 182–191 (ACM 0-89791-982-3/98/0006), which is hereby incorporated by reference. This approach constructs a model for a storage device by composing models of its component parts. Component models operate as workload transformations, meaning that a component transforms characteristics of an input workload into that of an output workload, which is an input workload for a subsequent component. Though useful, this approach is limited in several respects. First, the approach has been applied only to disk drives, not disk arrays, which are far more complex systems of interconnected components. Second, the approach models components as single output transforms, not multi-output transforms. Third, the approach predicts latency only (i.e., how long it takes to service I/O requests), not throughput or other performance metrics that are limited by system constraints.

SUMMARY OF THE INVENTION

In one respect, the invention is a method for constructing a model useful for predicting performance of a system that includes a plurality of interconnected components defining at least one data flow path. The method references a workload specification for the system. The workload specification is handled by the components along the data flow path. The method models the system using one or more component models. Each component model represents selected one or more of the components. Each component model is arranged in like relationship to the data flow path as the selected one or more of the components represented by the component model. Each component model is (a) a constraint upon the workload specification input to that component model or (b) a transformer of the workload specification input to that component model so as to result in one or more output workload specifications that are input workload specifications to subsequent component models along the data flow path or (c) both a constraint and a transformer. At least one of the component models is a constraint.

In another respect, the invention is a method for predicting performance of a system that includes a plurality of interconnected components defining at least one data flow path. The method references a workload specification and models the system as described above. The method also operates on the workload specification by at least some of the component models along the data flow path. In one preferred form, operating on the workload specification involves arranging the component models in a hierarchy corresponding to the data flow path; using the specified workload specification as input to the topmost component model in the hierarchy; and applying one or more of the component models to its input workload specification, starting with the topmost component model and then component models at progressively lower levels in the hierarchy. Output workload specification at one level is input workload specification at the next lower level. If the component model comprises a constraint, the method evaluates whether the input workload specification satisfies or violates the constraint. If the component model comprises a workload specification transform, the method modifies the input workload specification so as to produce one or more output workload specifications that are input workload specifications for component models at the next lower level in the hierarchy.

In yet another respect, the invention is a computer readable medium on which is embodied content for use in predicting performance of a system that includes a plurality of interconnected components defining at least one data flow path, according to the principles described above.

In yet other respects, the invention is an apparatus for use in predicting performance of a system that includes a plurality of interconnected components defining at least one data flow path. In one form, the apparatus comprises a memory on which is stored data specifying a workload for the system; a memory on which is stored data modeling the system using one or more component models, each component model representing selected one or more of the components, each component model arranged in like relationship to the data flow path as the selected one or more of the components represented by the component model, wherein each component model is (a) a constraint upon the workload specification input to that component model or (b) a transformer of the workload specification input to that component model so as to result in one or more output workload specifications that are input workload specifications to subsequent component models along the data flow path or (c) both a constraint and a transformer, and wherein at least one of the component models is a constraint; and a processor, connected to the memories, configured to computationally apply at least some of the component models along the data flow path to the workload specification. In another form, the apparatus comprises a means for specifying a workload for the system; a means for modeling the system using one or more component models, each component model representing selected one or more of the components, each component model arranged in like relationship to the data flow path as the selected one or more of the components represented by the component model, wherein each component model is (a) a constraint upon the workload specification input to that component model or (b) a transformer of the workload specification input to that component model so as to result in one or more output workload specifications that are input workload specifications to subsequent component models along the data flow path or (c) both a constraint and a transformer, and wherein at least one of the component models is a constraint; and a means for computationally applying at least some of the component models to the workload specification along the data flow path.

In comparison to the prior art, certain embodiments of the invention are capable of achieving certain advantages, including some or all of the following: (1) the performance of a data storage array can be predicted with sufficient accuracy and reduced complexity; (2) as a result, resources can be planned and provisioned in a more cost-effective manner; (3) component models for one model can be reused in modeling other systems, further enhancing the cost-effectiveness of this approach in the long run, especially when the same off the shelf components are re-utilized; (4) modelers gain greater insight into the inner workings of the system, because the structure of the model generally mirrors the internal structure of the real system (e.g., which components are bottlenecks); (5) component models can be constructed and calibrated in isolation, improving and simplifying the verification process; (6) individual components are easier to model than the whole disk array, allowing more accurate component models to be generated and thereby improving the accuracy of the model for the array; and (7) by enabling the use of multi-output transform models, more accurate models of systems with complex interconnections are possible. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

I. Overview

Figure 1:
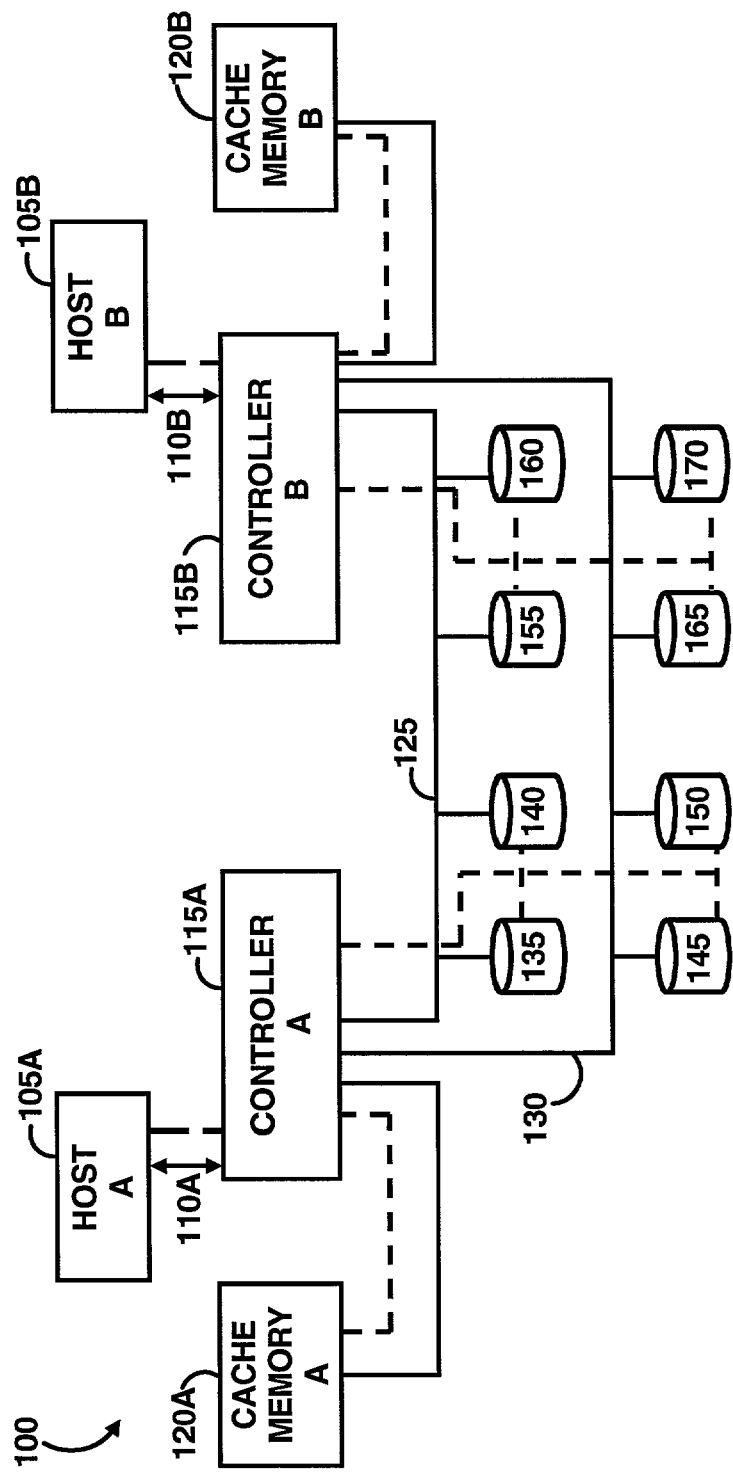
FIG. 1 is a block diagram of an exemplary computer disk array storage system.

One embodiment of the invention provides a method for the prediction of the viability of a proposed networked system, such as disk array system, based upon a steady-state prediction of average performance in the case of a proposed or target workload specification. A model is built, providing analog constructs for hardware components of the system as a series of data flow constraints and where required, data workload modifications or transformations for downstream components. The model collects all data flow constraint evaluations. Only if all component models report that no constraint has been violated, the array is validated as providing the required quality of service for the given I/O workload specification.

As used herein, a "workload" is any set of I/O accesses (also termed "requests") generated by a host computer; the term "workload characterization" refers to any process of extracting characteristics of the workload. Preferably, the characteristics are important and relevant to the steady state behavior of the workload. In other words, workload characterization is a process of generating a summary of a workload without including every single I/O access from the hosts. The term "workload specification," as used herein, refers to a particular result of a workload characterization. A workload specification comprises one or more characteristics of the I/O accesses generated by the host computers 105A or 105B, for example. Workloads specifications can be stated in terms of the following illustrative parameters and their values or statistics: access type (e.g., read or write), access rate (given in I/O accesses per second, or "IOps"), access size, spatial correlation of accesses (i.e., the spread across contiguous or non-contiguous addresses), temporal correlation of accesses (i.e., the degree to which the same data is repeatedly requested), concurrency of multiple requests and correlation among multiple I/O streams. In one embodiment, a workload specification is a set of attribute-value pairs, where each attribute identifies the type of parameter (e.g., request rate or request size) and each value is a deterministic number or statistical characterization (e.g., probability distribution or density function). A workload specification can be represented as a data structure, according to programming techniques well known to those in the art. However, many alternative representations can be used for a workload specification in the context of the invention, as would be evident to someone skilled in the art.

One embodiment of the method models performance by hierarchically decomposing systems into components and developing models for the components. Predictions for the performance of the whole system are then computed by composing the models for those individual component models. The method employs morphological information in the selection of which components to model. In other words, there can be many decompositions of a system, but the method selects a decomposition based on the physical configuration of the system (i.e., its morphology) along a data path.

The method takes advantage of the fact that different array types or user-proposed physical models are composed of similar individual parts, devices, or subsystem units, also referred to generically as "components," and that different array types often have similar structures or substructures.

Although an illustrative embodiment of the invention is described in this and the following sections for a disk array storage system, those skilled in the art should recognize that the model and modeling paradigm described herein may be applied to other complex network systems.

II. Model Construction

Figure 2:
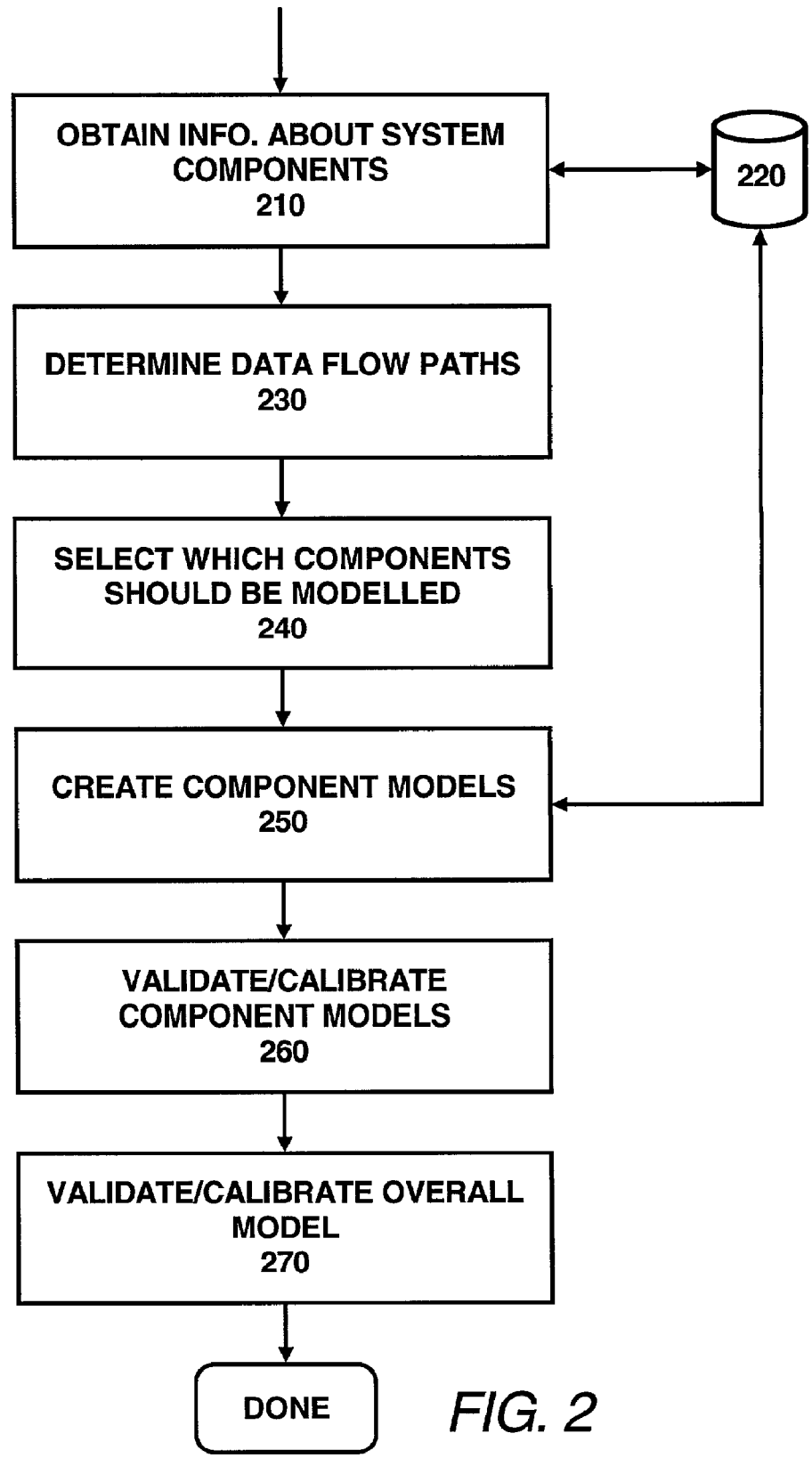
FIG. 2 is a flowchart of a model construction process, according to an embodiment of the invention.

FIG. 2 is a flowchart of an overall process 200 of building and utilizing a model of the computer disk array storage system 100, according to an embodiment of the invention. The process 200 begins by obtaining (210) information about components of the system 100. Information about the components might be obtained from the vendor who built or sold the disk array, by inspecting the hardware, or from performance measurements. Performance data regarding most components of the system—namely controllers, cache memories (e.g., random access memory integrated circuits (RAM)), buses and other interconnects, individual disk drives, or any other device or sub-device of interest to a system designer as a potential workload bottleneck—may also be available from the original equipment manufacturers (OEM). For example, OEM documentation typically lists the following performance specifications for an individual disk drive 135–170 (FIG. 1): seek time, rotational latency, mean time between failure (MTBF), peak transfer bandwidth, and the like, as would be known to those skilled in the art.

Note that although some components may be physically inseparable (e.g., the cache memory 120A may be permanently installed in the controller 115A), the process 200 can treat them as separate components, based on prior knowledge of how to best partition the system 100.

The component information may have been obtained previously and stored in a component database 220, in which case the obtaining step 210 preferably retrieves the information from the component database 220. If the information is obtained for the first time during the obtaining step 210, then it is preferably stored in the database 220 for subsequent use.

The process 200 determines (230) data flow paths between the components. Like component specifications, this interconnection information might be obtained from the vendor who built or sold the disk array, from inspection of the hardware, or from knowledge of how LUs are configured. A given system may have different sets of data flow paths for different LU configurations, as the LU configurations may change dynamically. Though not illustrated in FIG. 2, the data flow paths determined in step 230 optionally may be retrieved from or stored in the component database 220 or a separate database that contains interconnection data.

The process 200 next selects (240) which components should be modeled. Any element or part or subpart of the system 100 having sensible individual performance specifications and material relevance to the overall system performance characteristic of interest can be modeled or sub-modeled.

The structure of the model preferably resembles the structure of the system 100. Only those physical components of the system 100 that are material to the relevant performance characteristic(s) of the system 100 have an analog in the model. In other words, the model is "morphological" with respect to the system 100. However, the model structure and real system structure may differ in some respects.

For example, as a guideline in performing the selecting step 240, one would typically utilize a separate component model (e.g., "analog") for each system 100 functional unit that stores, transforms, or transfers data in order to service accesses issued by hosts A or B on data in the array of disks 135–170. This guideline implies component models are employed for caches and disks, but not for power supplies or front panel lights.

The component models usually form a directed acyclic graph, meaning that any path starting at the top of the model ends after passing through a finite number of component models, when traveling in the direction of the data flow.

The selecting step 240 is preferably performed by a knowledgeable human. In extreme cases when a component model cannot be created (see discussion of step 250 below) or can be created only with great difficulty, then the selecting step 240 can omit that component from the model. This is a standard tradeoff between complexity and accuracy.

After the selecting step 240, the process 200 next creates (250) models for each component determined to be part of the overall model during the selecting step 240. An objective of the creating step 250 is to characterize each component model's constraint(s) and/or workload specification transformation characteristics. The sources of this information are various, including, for example, vendor/manufacturer specifications and measurements from performance experiments. If a similar component has been studied before, the same or similar experimental design may be reused to determine the characteristics of the component model.

Optionally, the creating step 250 may interface with the database 220 to retrieve the same or similar component models. If the same component model has been characterized before and stored in the database 220, the creating step 250 need only retrieve that model from the database 220. If a similar component model (e.g., within the same family of generic components) has been characterized before and stored in the database 220, then the creating step 250 can retrieve that model from the database 220 and modify it as necessary. If the result of the creating step 250 is a new component model, the creating step 250 preferably stores the component model in the database 220 for later use, unaltered or modified, as a whole component model or a sub-model of a component. A component model may be a composite of sub-models.

Although FIG. 2 illustrates that the obtaining step 210 and the creating step 250 interface to the same database 220, separate databases for component information and component models could also be utilized.

The database 220 (or something similar) enables model reusability, to significant advantage. In the construction of networked systems using commercially available, off-the-shelf components, it is common to encounter the same or similar components in different arrays. Because of model reusability, the process 200 becomes increasingly more powerful and easier to use as it builds upon a growing database of known component models.

The creating step 250 characterizes each component model as a constraint(s) and/or workload specification transforms. A constraint is a limit, requirement or threshold representing a maximum, minimum or other capability of the component being modelled. A constraint may be embodied as a simple number, a formula or an algorithm for evaluation. Constraints are discussed in greater detail below, with reference to FIG. 3B. During execution of the model (described in detail below), a component model with a constraint evaluates whether its input workload(s) violates its constraint(s).

Each model component, except the ones having no outgoing flow, can also potentially include a workload specification transform (more simply called just "transform" or "transformation" or "transformer"), meaning that the model component's output workload specification(s) is a split and/or modification of its input workload specification. A transform can be specified, for example, as a simple percentage value or a formulistic division. Transforms are also discussed in greater detail below, with reference to FIG. 3B. During execution of the model, a component model with a transformation operates upon its input workload specification to produce output workload specification(s), in accordance with the component model's transforms.

The process 200 next preferably validates (260), and if necessary calibrates, each individual component model. The validating/calibrating step 260 is optional, though it is good practice and strongly recommended to ensure accuracy. The validating/calibrating step 260 for a particular component model involves applying to the component model an input workload for which the (real) component's behavior is known or tractable. The component model then operates on the input workload. The component model's output workload and constraint evaluation results are then compared to the known results to determine the magnitude of mismatch. If the mismatch is too large, then the component model's parameters can be calibrated in an attempt to decrease the mismatch.

After validating and calibrating individual component models, the process 200 preferably validates (270), and if necessary calibrates, the overall model. Like the validating/calibrating step 260, the validating/calibrating step 270 is optional, though it is good practice and strongly recommended to ensure accuracy. The validating/calibrating step 270 can be performed similarly to the validating/calibrating step 260. A workload for which the overall system's performance is known is applied to the topmost component model(s) of the overall model, and the model operates on the workload. The model's predictions are then compared to the known results to determine the magnitude of the mismatch. If the mismatch is too large, then the model's parameters can be calibrated to decrease the mismatch.

The validating/calibrating steps 260 and 270 can be performed over a range of workloads by successively applying different workload specifications to the component or overall model. A first workload specification can be tested through the model. If the model passes the test, a second (usually greater or more demanding in some sense) workload specification can be run through the model. If this second workload specification passes, the workload specification can be made more demanding again and again, recursively, until the system reaches a saturation point, where it is no longer able to satisfy the workload. If the model reaches saturation at a point sufficiently near where analysis or empirical studies show saturation of the real system, then the model is satisfactory.

Figure 3:
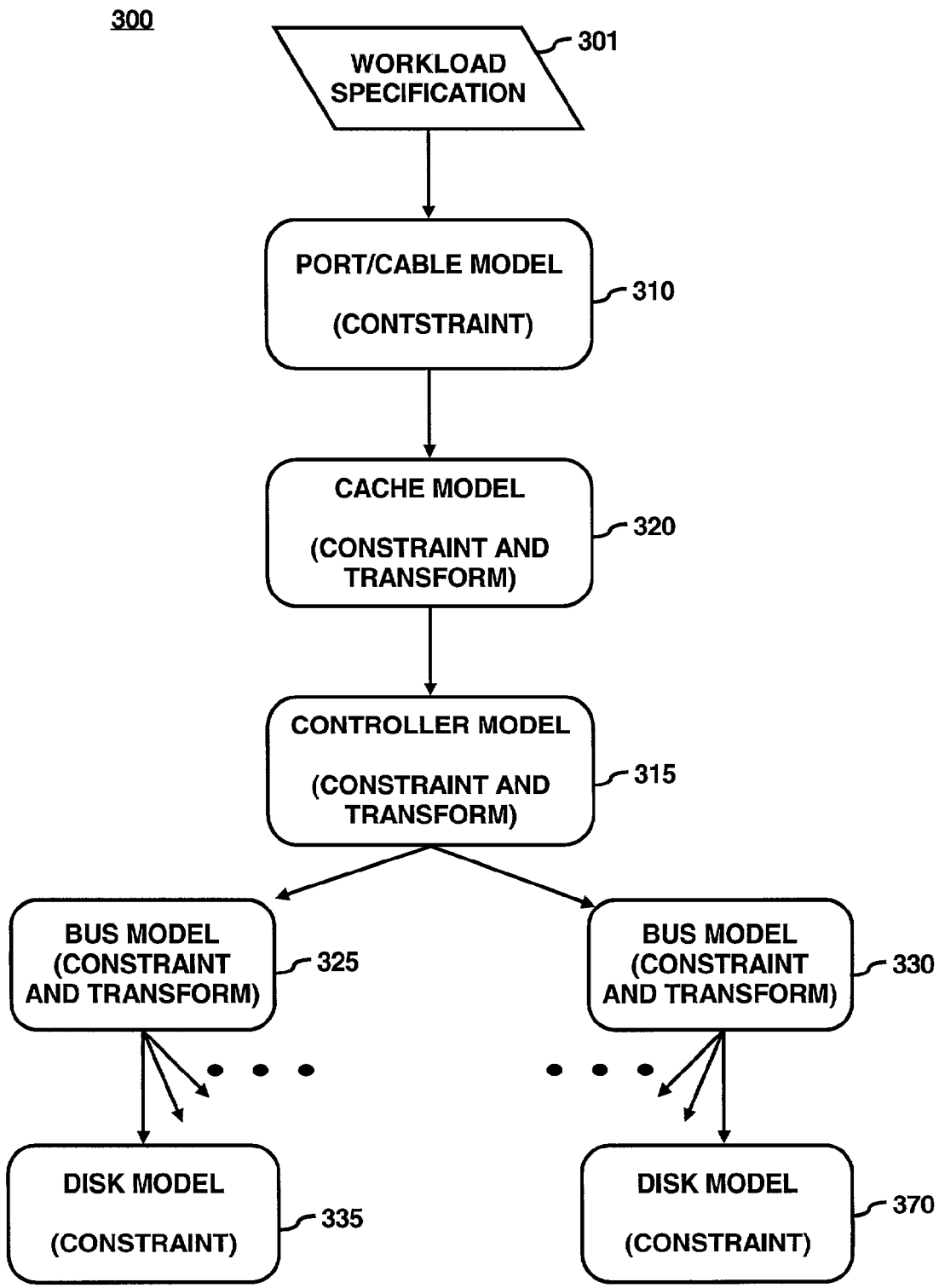
FIG. 3 is a diagram of a morphological model of the disk storage system of FIG. 1.

FIGS. 3 illustrates a result of the process 200 applied to the networked disk array 100 (FIG. 1). FIG. 3 is a morphological model 300 of the networked disk array 100 with respect to the host computer 105A. (A similar morphological model of the network disk array 100 can be constructed with respect to the host computer 105B.) The morphological model 300 comprises a number of model components. Each component model is either a constraint, transform or both. An interconnect (e.g., port/cable) model 310, corresponding to the cable 110A, is a constraint. A cache model 320, corresponding to the cache 120A, is a constraint and a transform. A controller model 315, corresponding to the controller 115A, is also a constraint and a transform. Bus models 325 and 330, corresponding to the upper bus 125 and the lower bus 130, are constraints and transforms. Finally, the disk models 335–370 are constraints corresponding to the disk drives 135–170. The input to the morphological model 300 is a workload specification 301, which represents some level of activity by the host computer 105A. The morphological model 300' does not predict host computer performance.

The morphological model 300 contains several constraints. Some constraints are relatively simple. For example, the constraint in the port/cable model 310 is likely to be a maximum total bandwidth (e.g., less than 100 megabytes per second (MB/s)). Either the workload specification 301 meets the 100 MB/s requirement or not. Often, many constraints are substantially more complex. For example, an individual disk drive is likely to comprise several constraining factors, each of which sets limits on quantities (e.g., read-write actuator movement including seek and settling time).

The morphological model 300 also contains several transforms. Every component comprises at least one constraint and may or may not comprise one or more transforms as well. One example of a transform is in the bus models 325 and 330, which model the buses 125 and 130 in part by a splitting workload transform in that the total data traffic carried on a bus is distributed among the multiple disk drives. The distribution is determined by some protocol and/or statistical parameters. The transform is derived from those protocols and/or statistical parameters. As another example, the cache 120A is modelled in part by a transform to capture the fact that the cache 120A manipulates data flow. In the steady state, the cache 120A services some percentage of the host computer's (105A) data accesses, while only the remaining data accesses are forwarded to the disk drives 135–270. As well as altering the volume of data traffic, the cache 320 also alters certain other qualities of the data traffic. For example, the cache 120A might pre-fetch extra data in blocks, in anticipation of a sequential accesses by the host 105A. If this behavior is significant to the particular aspect of the performance to be predicted, then the cache model analog 315 should include this transform.

Note that the morphological model 300 does not include a distinct analog of the interface between the controller 115A and the cache 120A. This omission could be the result of any of the factors discussed above in relation to the selecting step 240. For example, the controller 115A and the cache 120A may be so inextricably linked in performance and failure modes, that there is no separate performance characteristic of consequence for the interface 322. As another example, the pertinent performance characteristic (e.g., bandwidth) of the interface may be so high, that it is extremely unlikely to be a material constraint on the overall storage array 100. As yet another example, the performance dynamics of the interface may be so complex that modeling is not worth the difficulty.

Note also that the morphological model 300 exhibits modularity. Modularity allows nesting of model components as well as independent development, testing, replacement and/or refinement of model components. Model components may be nested within other model components, in as many layers as desired, to construct model components using sub-models.

III. Model Execution

Figure 4:
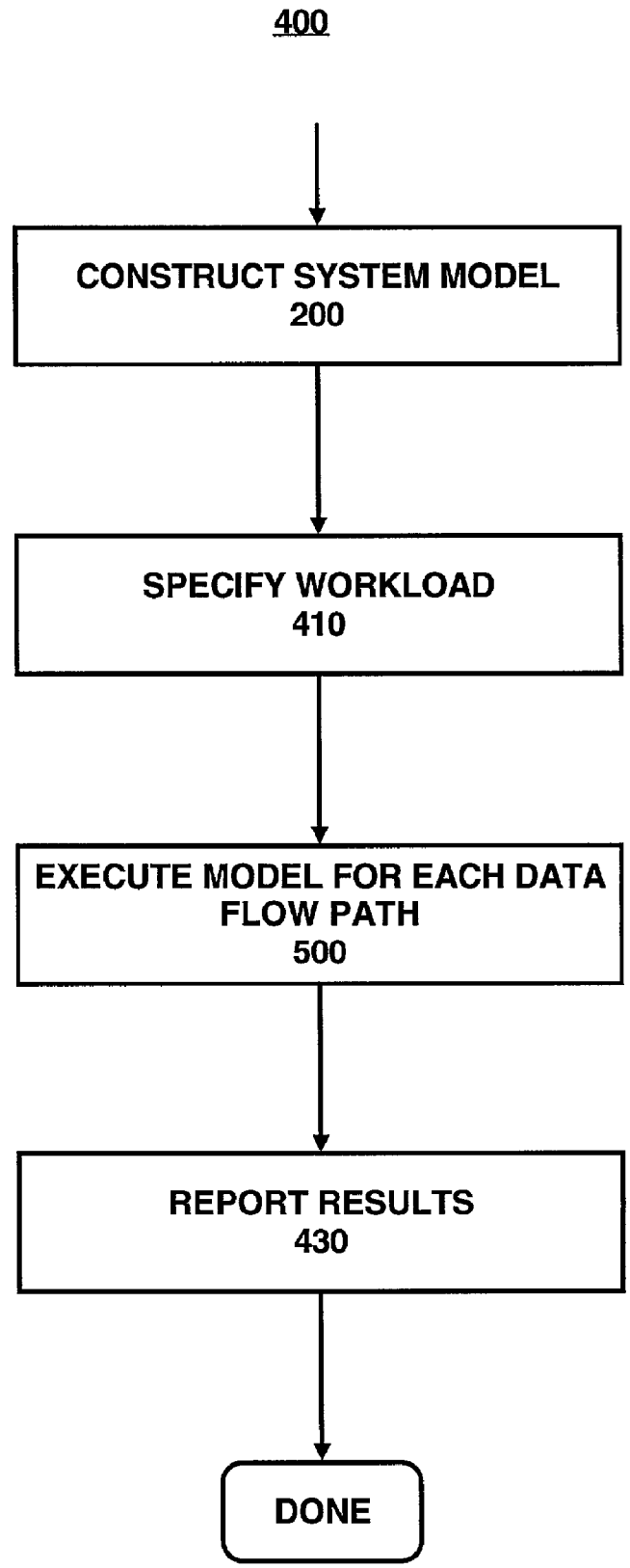
FIG. 4 is a flowchart of an overall performance prediction process, according to an embodiment of the invention.

FIG. 4 is a flowchart of an overall performance prediction process 400, according to an embodiment of the invention. The process 400 begins by constructing (200) a model, as described in the previous section. The process 400 then specifies (410) a workload, executes (500) the model under the workload conditions once for each data flow path, and reports (430) the results. The steps 410, 500 and 430 may be repeated for re-specified workloads, as desired. The steps 410, 500 and 430 are described in greater detail in the following.

The workload specification step 410 characterizes a workload that is typically intended to represent operating conditions. Although a workload could be any general operating condition, it is usually related to the I/O activity of one or more hosts. A workload is preferably specified in terms of parameters that define data flow. The parameters may be target statistics provided by an end-user of a storage system. Illustrative workload parameters are request rate, request size for a specific application, and request block location. Relevant statistics for these workload parameters may include mean, variance, coefficient of variation (i.e., "burstiness" in the case of inter-arrival time), and statistical distribution (e.g., Poisson, Gaussian, etc.) Workload specifications may differ for different LUs and/or different applications.

More specifically, a workload can be embodied as a data structure having member data elements for each parameter (e.g., request rate and request size). The parameters may be simple scalar variable types or, more likely, data types that represent random variables in terms of their statistics. Those skilled in the art are accustomed to programming such data structures.

Figure 5A:
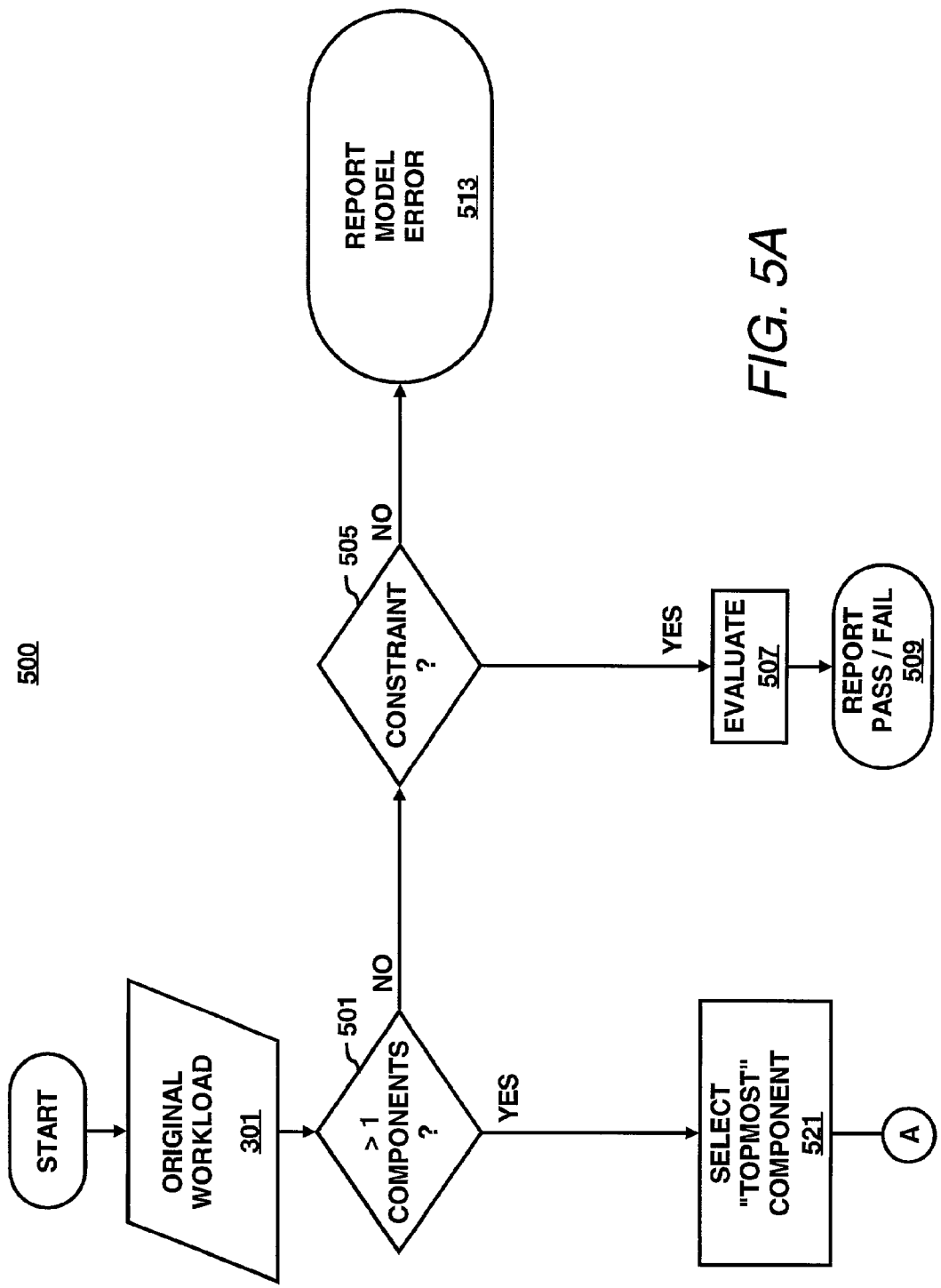
FIG. 5 is a flowchart of a model execution process, according to an embodiment of the invention.
Figure 5B:
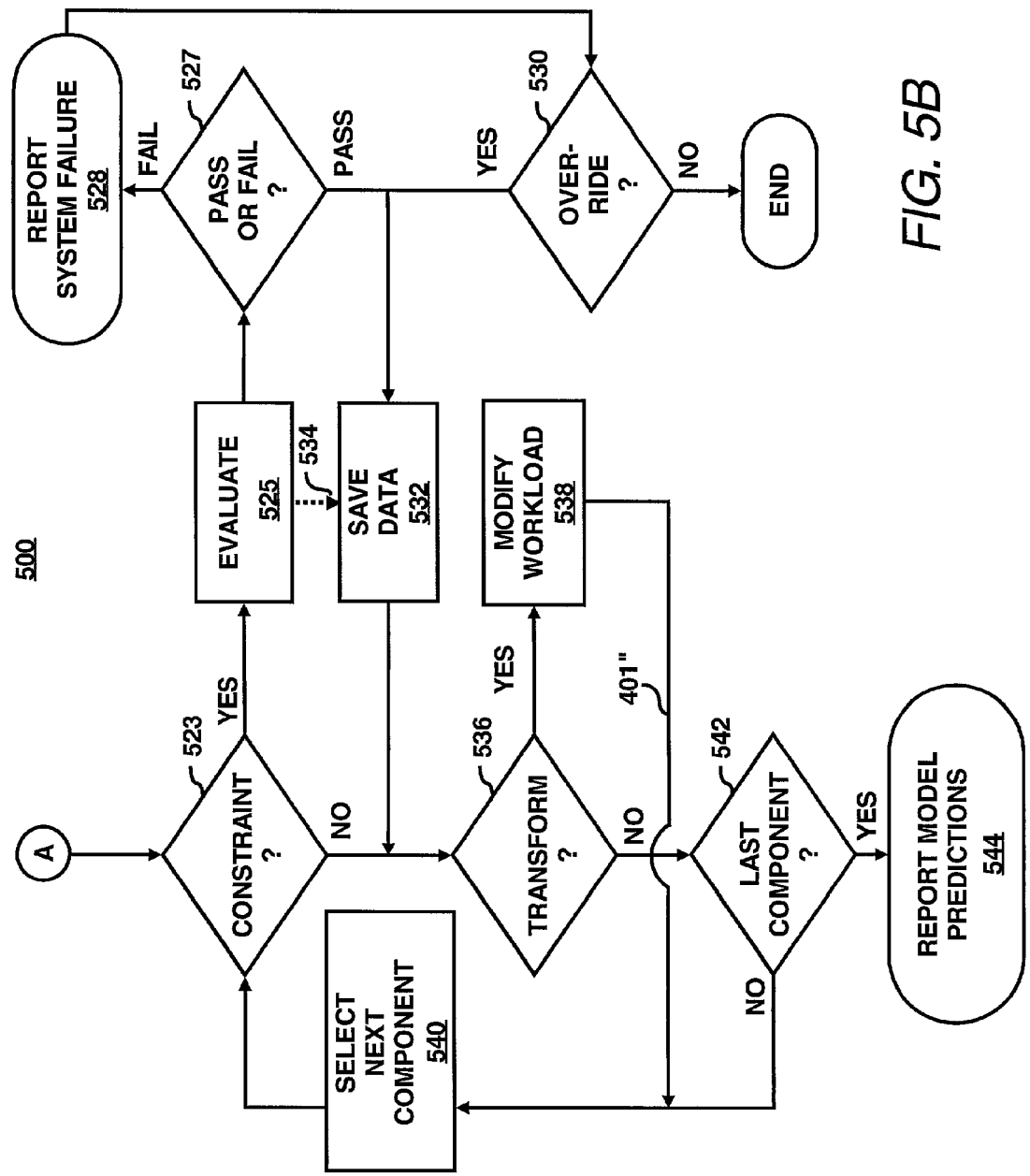

FIG. 5 is a flowchart of the model execution process 500, according to an embodiment of the invention, with reference to the morphological model 300' (FIG. 3B).

The original workload specification 301—namely, the predetermined workload specified in the step 410—is input to the system beginning at a "topmost" component model. Each component model operates upon the workload specification 301, perhaps as modified from component to component, by evaluating constraints under the workload specification and/or transforming the workload specification for input to subsequent model components. In other words, the workload specification 301 is computationally input to the component models. Mathematically, a component model is a function, an input workload specification is an argument of that function, and the output workload specification is the value of the function at that argument.

In the morphological model 300', the topmost component model is the port/cable model 310. Note that some system models may have only a single component model. Therefore, the process 500 checks (501) which path follows. For a one-component model, the process 500 checks (505) whether it is a constraint. If it is, the process 500 evaluates (507) whether the original workload 301 satisfies the constraint. and forwards (509) the results (preferably binary, pass/fail) to the reporting step 430. If the single component is not a constraint, then the model is erroneous (containing no constraints), in which case the process 500 reports (513) that fact that the model is erroneous to the reporting step 430.

Assume now that a more normal situation of multiple model components representing constraints and workload transformations exists, as shown in FIG. 3. All model elements 310'–335' are ordered, so that the "topmost" or "next" element(s) is always known. In this case, the process 500 selects (521) the constraint 310' (analog of the host-to-controller cabling 310) as the topmost system model component. The process then checks (523) whether this component model (also termed "analog") comprises a constraint, and if not, immediately checks (536) whether the analog is a transform. If the analog is not a transform, the process 500 checks (542) whether the analog is the last component in the model. If not, the process 500 selects (540) the next component and loops back to the constraint checking step 523. The process iteratively repeats the constraint checking step 523 and transform checking step 536, analog by analog from topmost to last. If, after the last iteration, the process 500 exits the last component checking step 544, then all constraints would have been satisfied and the system validated, unless the override option is enabled, in which case the model's predictions may be validation or failure of the system. In either case, the process 500 reports (544) the model's predictions for the data flow path just analyzed.

If the constraint checking step 523 determines that the analog comprises a constraint, then the process 500 evaluates (525–527) whether the workload specification input to the analog satisfies the constraint. If the workload specification passes this constraint, then the process 500 saves (532) that fact and perhaps the passing margin and/or other supporting data, and then returns to the main loop for the transform checking step 536. In the event of a constraint failure, the process 500 forwards (528) that fact to the reporting step 430 and checks (530) whether an override mode is enabled. If override is not enabled, then the process 500 immediately ends. The system design has been found to be inadequate at the specified workload specification. In other words, there is a system bottleneck rendering the system design insufficient for the particular workload specification. There is no pressing need to continue testing the system for validation. If override is enabled, then the process 500 continues to check the entire model; in this case, the failure margin and/or other supporting data are saved (532), and the process returns to the main loop for the transform checking step 536.

If the transform checking step 536 determines that the analog comprises a transform, then the process 500 modifies (538) the workload input to the analog, so as to generate a modified output workload specification, which will be input to another analog to be checked later. As with the constraint evaluation steps 507 or 523, transforms can be simple (e.g., partition data flow in half) or complex requiring a subroutine algorithm application performed on the original workload specification 310 or a modified workload specification currently being received by an analog.

As can be seen from FIG. 5, the model execution process 500 predicts system viability for one data flow path by running the workload specification through the ordered model elements sequentially, sometimes changing—transforming—the workload specification. The evaluation ceases and reports as soon as a first failure is recognized.

The over-ride provision can be implemented to determine if other bottlenecks exist in the current design, step 530. Such an over-ride option provides an ancillary process for evaluation of all components having violated constraints. But, there is also the possibility that the system is non-linear in reacting to the particular workload, so such an over-ride must be employed with caution as to implications. Alternatively, knowing all failed components may point to an insight as to changing the workload parameters and a salvaging the system hardware design as is. Although the over-ride provision can preferably be disabled, in alternative embodiments it can be regularly and routinely performed, as shown by the dashed arrow 534.

Individual constraint evaluations (step 507 or 525) may be simple. For example, in the case of the constraint 310' corresponding to the cabling 310, the data transmission capability either passes or fails. Other constraints can be more complicated, requiring, e.g., solutions to mathematical equations to determine if the constraint stops the data flow. Development of particular evaluation equations are well within the purview of a person of average skill in the art. For example, for a controller component, an equation may be in terms of bandwidth consumption of all the parsed request streams:

$$\Sigma(\text{request\_rate}(Si) \times \text{request\_size}(Si)) \leq \text{bandwidth\_capacity}.$$

As another example, for a disk head actuator component, an equation may be in terms of utilization of the actuator, based on locality of the workload and on the acceleration and settling characteristics of the specific actuator component.

As yet another example, an illustrative constraint equation for throughput of a disk drive is the following:

$$\Sigma(\text{read\_request\_rate}(Si) \times \text{disk\_read\_service\_time} + \text{write\_request\_rate}(Si) \times \text{disk\_write\_service\_time}) < 1,$$

where the summation is across all streams to/from the disk. The disk becomes saturated when the left side of the inequality approaches one. The parameter disk_read_service_time is a mean value that depends upon whether the datum is found in the disk's cache. Because the service time for data read from a cache is very small compared to accessing magnetic medium, it can be approximated as zero. For data not cached, the read service time is the sum of positioning time and transfer time, as follows:

$$\text{disk\_read\_service\_time} = (1 - \text{disk\_cache\_hit\_prob}) \times (\text{disk\_read\_position\_time} + \text{read\_request\_size}/\text{disk\_transfer\_rate}).$$

The positioning time variable can be estimated as $$\text{disk\_read\_position\_time} = (\text{mean\_read\_disk\_seek\_time}/\Sigma \text{queue\_length}(Si)) + \text{disk\_rotation\_time}/2.$$

The variables mean_read_disk_seek_time and disk_rotation_time are device parameters obtained through measurement and typically given as part of the disk specifications. Cache hits for reading typically arise due to read-ahead operations. After servicing a read, a disk controller typically continues to transfer data into the on-board disk cache in anticipation of more sequential reads in the future. This improves performance for sequential I/O traffic by eliminating positioning delays. Disks typically access no more than a segment of data for read-ahead. If a request from a different stream arrives during a read-ahead operation, the disk stops the read-ahead and services the new request. When requests from multiple sequential streams are queued together, the amount of read-ahead for a stream can be estimated as $$\text{read\_ahead\_amount}(Si) = [\text{read\_request\_rate}(Si) \times \text{queue\_length}(Si)/\Sigma(\text{read\_request\_rate}(Si) \times \text{queue\_length}(Si))] \times \text{disk\_cache\_segment\_size}.$$

From this, the cache hit probability can be estimated as $$\text{disk\_cache\_hit\_prob}(Si) = \text{read\_request\_size}(Si)/\min(\text{read\_run\_count} \times \text{read\_request\_size}(Si), \text{read\_ahead\_amount}(Si)).$$

As for writing, disk caches are write-through only because they do not have battery power to save data in case of a power loss. While only the first request in a sequential write stream experiences a seek time, unlike reads, all operations experience rotational delays, because by the time the next request in a sequential run arrives at the disk, the disk platter has already rotated to a new position. With this in mind, the average positioning delay incurred for a write request can be estimated as disk_write_position_time=mean_write_disk_seek_time/
      (write_run_count×Σqueue_length(Si))+disk_rota-
      tion_time/2.

Now the write service time can be computed as a sum of the positioning and transfer times:

disk_write_service_time=disk_write_position_time+
      write_request_size/disk_transfer_rate.

This is the last variable needed to complete the disk throughput constraint equation.

All constraint evaluations (steps 507 and 525) have certain aspects in common. A constraint parameter (a component may have more than one) is calculated from the workload given. The constraint parameter is then compared to a limit calculated from the component specifications in memory. The result is either a violation or a validation of the component's ability to handle the workload in question.

Optionally, statistical data, which may be saved at the step 532, for a validation may include the fraction of the limit being used. For example, for a 100 MB/s constraint, where the workload parameter is 80 MB/s, the report should be in the nature of "constraint not violated (PASS), 80% utilization," where "utilization" is defined as what fraction of a components performance capability is being employed by the current workload, in other words, what is the resource current consumption level.

Alternatively, the overall model can collect the maximum (or theoretically also the minimum) of the constraint utilization, or which component has the maximum utilization, or even the complete set of constraint utilizations when the system is validated (544) or when the over-ride check 530 is employed. These utilization values are useful, for example, if the end-user of the model wants to see how much safety margin there is for a workload that can be performed, using a maximum utilization of less than 100%. Or, if the end-user needs to know how much to scale down a workload that can not be performed, when the model evaluated is at a maximum utilization of greater than 100%. The model can help identify potential bottlenecks for increased workloads, such as which disk array to upgrade. Moreover, the utilization values can be used by a system OEM to see whether the capabilities of all components are balanced. It should be noted that constraint evaluations may be non-linear; the maximum utilization can not be used automatically to scale workload. Other statistical analyses can be developed for specific implementations.

Individual workload modifications (step 538), like constraint evaluations (step 507 or 525), may be relatively simple or complex, involving solutions to mathematical equations. Development of particular evaluation equations are well within the purview of a person of average skill in the art. For example, what follows is an illustrative workload transformation of a cache model. This array cache model receives a list of input workloads and outputs a list of modified workloads to reflect a reduction in request rate due to cache hits. In steady state, both read and write requests cause disk accesses only when there is a cache miss. Suppose that the total cache size is total_cache_size and there are n streams S1, S2, . . . , Sn input to the cache model. Denote the corresponding output streams as S1', S2', . . . , Sn'. Assume that the cache is divided into n parts, each of cache size cache_size(Si), each devoted to one of the n streams. Then, cache_size(Si)=total_cache_size×[request_rate(Si)/
      Σrequest_rate(Si)], where the summation is taken over all streams. Next, approximate the probability that a request is a hit by the probability that the number of bytes accessed by the stream between to accesses to the same block is less than cache_size (Si). This is the re-reference distance, whose statistical distribution can be part of the workload. Thus, the workload transformation for this cache model is request_rate(Si')=request_rate(Si)×P
      [re_reference_distance>cache_size(Si)].

Alternative embodiments of the specific steps of the model execution process 500 are possible. The exemplary embodiment just described is basically a simple pass-fail version. The model can stop evaluating constraints as soon as the first constraint is violated for the current workload parameters. In another embodiment, assuming flexibility in the order of evaluation, the model could first evaluate those constraints that have the lowest cost of evaluation or the highest probability of being violated.

Preferably, the model execution step 500 can be performed quickly (one the order of seconds or sub-seconds).

Returning to FIG. 4, the reporting step 430 is performed after the model execution step 500. Based on the results of model execution step 400, a report as to the viability of the proposed system of components for the specified workload is reported to the end-user. Other data compiled from running the workload through the model can also be reported as discussed above with respect to FIG. 5.

All or part of the overall performance prediction process 400 can be performed by a computer program. The computer program can exist in a variety of forms both active and inactive. For example, the computer program and objects can exist as software comprised of program instructions or statements in source code, object code, executable code or other formats; firmware program(s); or hardware description language (HDL) files. Any of the above, as well as an encoding of the model or workload specification, can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

IV. Apparatus

Figure 6:
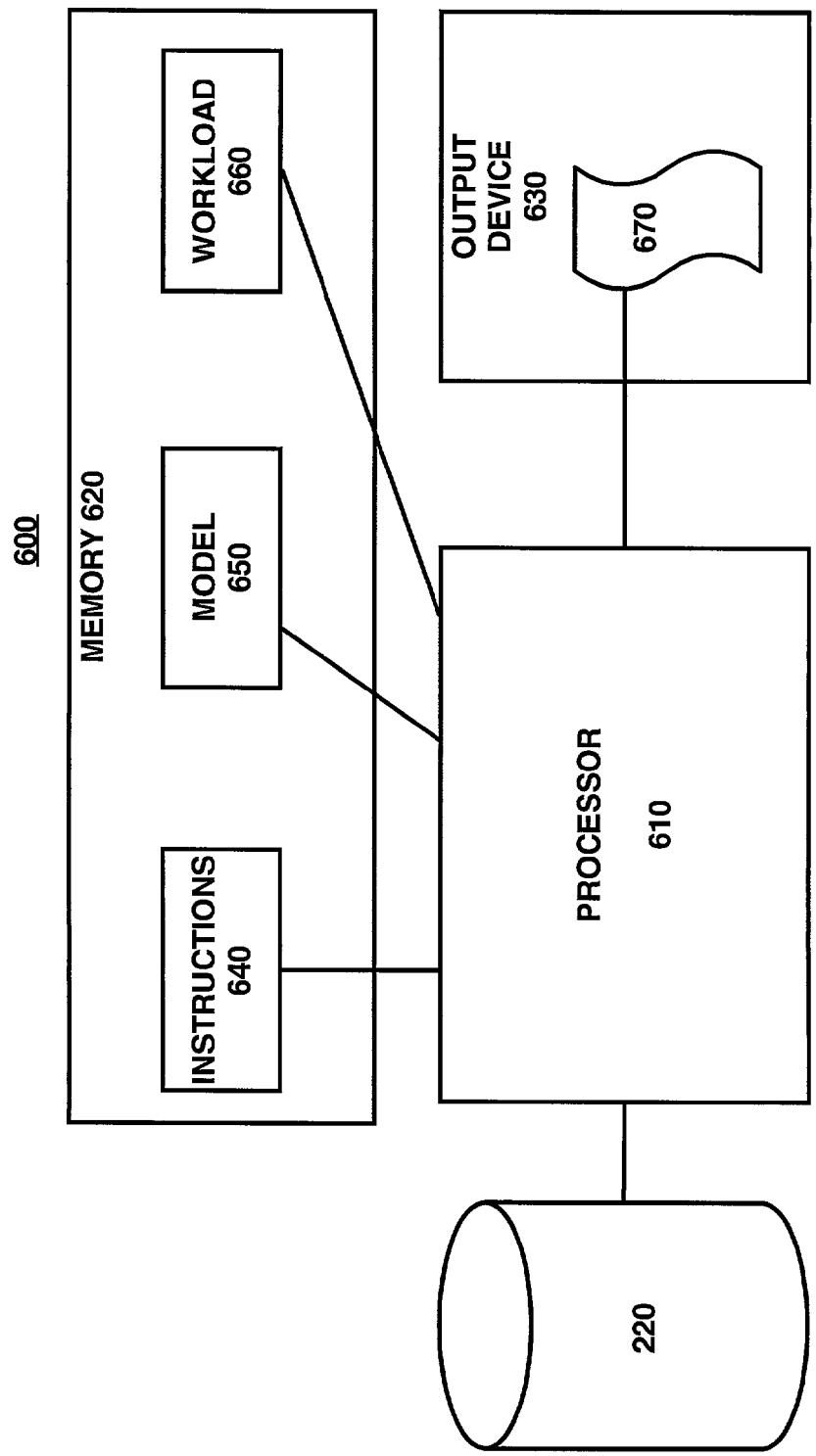
FIG. 6 illustrates an apparatus that performs the method of FIG. 4, according to one embodiment of the invention.

FIG. 6 illustrates an apparatus 600 that performs the method 400, according to one embodiment of the invention. The apparatus 600 comprises a processor 610 interfacing to the database 220, a memory 620 and an output device 630. The memory 600 stores instructions 640, model data 650 and workload specification data 660. The instructions 640 are the program steps that perform all or part of the method 400. The model data 650 is an encoding representing the models constructed during the process 200. The workload specification data 660 is an encoding of the workload specified in the step 410. The processor 610, when executing the instructions 640, creates the model data 650 and the workload specification data 660 as well as predicts performance by running the workload specification through the model. The output from the processor 610, according to the step 430, are the results 670.

The processor 610, as configured in the apparatus 600, is preferably a general purpose microprocessor, which is one specific structure for specifying a workload that traverses a data flow path, modeling a system using one or more component models and computationally applying the workload to at least some of the component models along the data flow path. Those skilled in the art should recognize a variety of alternative structures, such as, programmable logic devices (e.g., PALs) and application specific integrated circuits (ASICs), to name just a couple.

V. Conclusion

What has been described and illustrated herein is a preferred embodiment of the invention along with some of its variations. The terms, descriptions and figures used herein are set forth by way of illustration only and are not meant as limitations. For example, although the various steps of processes are described above in a particular order for the sake of clarity in presentation, steps may be performed in a different order or simultaneously. Those skilled in the art will recognize that these and many other variations are possible within the spirit and scope of the invention, which is intended to be defined by the following claims— and their equivalents—in which all terms are meant in their broadest reasonable sense unless otherwise indicated. No claim element is intended to be construed under the provisions of 35 U.S.C. § 112, sixth paragraph, unless the element is expressly recited using the phrase "means for . . . "

What is claimed is:

1. A method for constructing a model useful for predicting performance of a system that includes a plurality of interconnected components defining at least one data flow path, the method comprising:
referencing a workload specification for the system; and
modeling the system using a plurality of components models, each component model representing selected one or more of the components, each component model arranged in like relationship to the data flow path as the selected one or more of the components represented by the component model, wherein the plurality of component models comprises (a) a constraint upon the workload specification input to that component model (b) a transformer of the workload specification input to that component model so as to result in one or more output workloads that are input workload specifications to subsequent component models along the data flow path and (c) both a constraint and a transformer, and wherein at least one of the component models comprises a constraint.

2. The method of claim 1 wherein the system is a disk array storage system.

3. The method of claim 2 wherein the selected one or more components are selected from the group consisting of interconnects, interfaces, controllers, caches, buses and disk drives.

4. The method of claim 1 wherein one of the component models is a composite of a plurality of constituent component models.

5. The method of claim 1 further comprising:
storing a component model so as to enable later retrieval when constructing a model for another system.

6. The method of claim 1 further comprising:
retrieving a component model originally used in a model of another system, wherein one of the component models is identical to or derived from the retrieved component model.

7. The method of claim 2 further comprising:
specifying the workload specification in terms of data flow parameters selected from the group consisting of I/O request type, request rate, request size, spatial correlation of requests, temporal correlation of requests, concurrency of requests and correlation among multiple I/O streams.

8. The method of claim 7 wherein the specifying step further comprises specifying statistics for the selected data flow parameters.

9. The method of claim 1 further comprising:
calibrating the model; and
validating the model.

10. A method for predicting performance of a system that includes a plurality of interconnected components defining at least one data flow path, the method comprising:
specifying a workload specification for the system;
modeling the system using one or more component models, each component model representing selected one or more of the components, each component model arranged in like relationship to the data flow path as the selected one or more of the components represented by the component model, wherein each component models is (a) a constraint upon the workload specification input to that component model or (b) a transformer of the workload specification input to that component model so as to result in one or more output workload specifications that are input workload specifications to subsequent component models along the data flow path or (c) both a constraint and transformer, and wherein at least one of the component models is a constraint; and
operating on the workload specification by at least some of the component models along the data flow path, wherein the operating comprises
arranging the component models in a hierarchy corresponding to the data flow path;
using the specified workload as input to the topmost component model in the hierarchy; and
applying one or more of the component models to its input workload specification, starting with the topmost component model and then component models at progressively lower levels in the hierarchy, wherein output workload specification at one level is input workload specification at the next lower level, wherein the applying step at each component model comprises
if the component model comprises a constraint, evaluating whether the input workload specification satisfies or violates the constraint;
if the component model comprises a workload specification transform, modifying the input workload specification so as to produce one or more output workload specifications that are input workload specifications for component models at the next lower level in the hierarchy; and If the component model does not comprise a workload specification transform, specification.

11. The method of claim 10 further comprising:
terminating the operating step the first time a constraint is violated.

12. The method of claim 10 wherein the evaluating step further comprises determining quantitatively the extent to which the input workload satisfies or violates the constraint.

13. The method of claim 10 further comprising:
reporting results of the computationally applying step.

14. The method of claim 13 wherein the results comprise a binary indicator, one value corresponding to the case in which all constraints are satisfied, the other value corresponding to the case in which one or more constraints are not satisfied.

15. The method of claim 13 wherein the results comprise the identifications of any model components having a constraint that is violated.

16. The method of claim 13 wherein the results comprise quantified assessments of the extent to which constraints are satisfied or violated.

17. The method of claim 10, further comprising:
recursively repeating the specifying step and the applying step until a predetermined condition occurs.

18. A computer readable medium on which is embodied content that, when executed, is used by a computer system in predicting performance of a system that includes a plurality of interconnected components defining at least one data flow path, the content comprising:
data specifying a workload for the system;
data modeling the system using a plurality of component models, each component model representing selected one or more of the components, each component model arranged in like relationship to the data flow path as the selected one or more of the components represented by the component model, wherein each the plurality of component models is comprise (a) a constraint upon the workload specification input to that component model (b) a transformer of the workload specification input to that component model so as to result in one or more output workload specifications that an input workload specifications to subsequent component models along the data flow path and (c) both a constraint and a transformer, and wherein at least one of the component models is a constraint; and
instructions for operating on the workload specification by at least some of the component models along the data flow path.

19. The computer readable medium of claim 18 wherein the content further comprises:
a database containing data related to component models other than or in addition to said component models.

20. The method of claim 1, wherein each of the plurality of component models represents at least one of the plurality of selected components, each component model arranged in like relationship to the data flow path of the selected plurality of components in the system.

21. The method of claim 10, wherein each of the plurality of component models represents at least one of a plurality of selected components, each component model arranged in like relationship to the data flow path of the selected plurality of components in the system.

* * * * *

UNITED STATES PATENT AND TRADEMARK OFFICE
CERTIFICATE OF CORRECTION

PATENT NO. : 7,050,956 B2
APPLICATION NO. : 09/843930
DATED : May 23, 2006
INVENTOR(S) : Mustafa Uysal et al.

It is certified that error appears in the above-identified patent and that said Letters Patent is hereby corrected as shown below:

In column 1, line 20, delete "modem" and insert -- modern --, therefor.

In column 12, line 38, delete "$\Sigma queue_{length}(Si)$" and insert -- $\Sigma queue\_length(Si)$ ) --, therefor.

In column 15, line 47, in Claim 1, delete "components" and insert -- component --, therefor.

In column 16, line 42, in Claim 10, after "constraint and" insert -- a --.

In column 17, line 1, in Claim 10, delete "If" and insert -- if --, therefor.

In column 17, line 2, in Claim 10, after "transform," insert -- then setting the output workload specification equal to the input workload --.

In column 18, line 4, in Claim 18, after "wherein" delete "each".

In column 18, line 5, in Claim 18, after "models" delete "is".

In column 18, line 9, in Claim 18, after "specifications that" delete "an" and insert -- are --, therefor.

In column 18, line 22, in Claim 20, after "one of" delete "the" and insert -- a --, therefor.

Signed and Sealed this

Twenty-eighth Day of April, 2009

JOHN DOLL
*Acting Director of the United States Patent and Trademark Office*